(12) United States Patent
Tsai

(10) Patent No.: US 7,826,151 B2
(45) Date of Patent: Nov. 2, 2010

(54) OPTICAL LENS SYSTEM FOR TAKING IMAGE

(75) Inventor: Tsung-Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 12/390,474

(22) Filed: Feb. 22, 2009

(65) Prior Publication Data

US 2010/0134904 A1  Jun. 3, 2010

(30) Foreign Application Priority Data

Dec. 1, 2008 (TW) .............................. 97146609 A

(51) Int. Cl.
*G02B 9/60* (2006.01)

(52) U.S. Cl. ................... 359/764; 359/708; 359/714; 359/766

(58) Field of Classification Search ................ 359/764, 359/766, 767, 714, 708

See application file for complete search history.

(56) References Cited

U.S. PATENT DOCUMENTS 3,023,672 A * 3/1962 Sandback ................... 359/753

* cited by examiner

*Primary Examiner*—Darryl J Collins
(74) *Attorney, Agent, or Firm*—Banger Shia

(57) ABSTRACT

An optical lens system for taking image comprises, in order from the object side to the image side: a first lens element with positive refractive power having a convex object-side surface; a second lens element with negative refractive power; a third lens element with positive refractive power having a concave object-side surface and a convex image-side surface; a fourth lens element with positive refractive power; a fifth lens element with refractive power; and an aperture stop located between an object to be photographed and the second lens element. In the optical lens system for taking image, the number of the lens elements with refractive power being limited to five. Such lens arrangements can effectively reduce the volume of the optical lens system, reduce the sensitivity of the optical lens system and obtain higher resolution.

27 Claims, 8 Drawing Sheets

OPTICAL LENS SYSTEM FOR TAKING IMAGE

BACKGROUND OF THE INVENTION

1. Field of the Invention

The present invention relates to an optical lens system for taking image, and more particularly to a miniaturized optical lens system for taking image used in a mobile phone camera.

2. Description of the Prior Art

In recent years, with the popularity of the mobile phone camera, the optical lens system for taking image has become thinner and thinner, and the electronic imaging sensor of a general digital camera is typically a CCD (Charge Coupled Device) or CMOS (Complementary Metal Oxide Semiconductor) sensor. Due to advances in semiconductor manufacturing, the pixel size of sensors has been reduced continuously, and miniaturized optical lens systems for taking image have increasingly higher resolution.

A conventional high resolution mobile phone camera usually consists of four lens elements, such as the optical lens system for taking image described in U.S. Pat. No. 7,365,920. However, the resolution of the mobile phone camera has been improved rapidly. As the pixel size of electronic imaging sensors gradually becomes smaller and smaller, the system requires higher image quality. The conventional optical lens system comprising four lens elements cannot satisfy the requirements of higher resolution optical lens systems. In order to provide better image quality with higher resolution, the number of the lens elements must be increased, but too many lens elements will increase the total track length of the optical lens system, so it will be difficult to maintain the objective of miniaturization of the optical lens system for taking image.

The present invention mitigates and/or obviates the aforementioned disadvantages.

SUMMARY OF THE INVENTION

The primary objective of the present invention is to provide an optical lens system for taking image comprising five lens elements to provide better image quality with higher resolution, effectively control the total track length of the optical lens system and maintain the objective of miniaturization of the optical lens system.

An optical lens system for taking image in accordance with the present invention comprises: in order from the object side to the image side: a first lens element with positive refractive power having a convex object-side surface; a second lens element with negative refractive power; a third lens element with positive refractive power having a concave object-side surface and a convex image-side surface; a fourth lens element with positive refractive power; a fifth lens element with refractive power; and an aperture stop being located between an object to be photographed and the second lens element. In the optical lens system for taking image, the number of the lens elements with refractive power being limited to five. Such lens arrangements can effectively improve image quality of the system and maintain the objective of miniaturization of the optical lens system.

In the present optical lens system for taking image, the refractive power of the system is mainly provided by the first lens element with positive refractive power. The second lens element with negative refractive power mainly serves to correct the chromatic aberration. The third lens element with positive refractive power serves to distribute the refractive power of the optical lens system so that the sensitivity of the optical lens system will be reduced. The fourth lens element and the fifth lens element serve as correction lens elements to balance and correct various aberrations caused by the optical lens system, effectively improving image quality of the system.

The first lens element provides strong positive refractive power, and the aperture stop is located close to the object side, so that the total track length of the optical lens system can be effectively reduced, and the exit pupil of the optical lens system will be far away from the image plane. Therefore, the light will be projected onto the sensor with a relatively small incident angle, this is the telecentric feature of the image side, and this feature is very important to the photosensitive power of current solid-state sensors, since they are more sensitive when the light is incident at a small angle. This also reduces the probability of the occurrence of shading. According to one aspect of the present invention, in the present optical system for taking image, the inflection points formed on the fourth lens element and the fifth lens element will contribute to a better correction of the incident angle of the off axis light with respect to the sensor.

In addition, in wide angle optical systems, it is especially necessary to correct the distortion and the chromatic aberration of magnification, and this can be solved by locating the aperture stop at the balance point of the refractive power of the system. In the present optical lens system for taking image, if the aperture stop is located in front of the first lens element, the telecentric feature of the optical lens system is emphasized, and the total track length of the optical lens system will become shorter. If the aperture stop is located between the first and second lens elements, the wide field of view is emphasized, and the optical system is less sensitive as well.

According to another aspect of the present invention, in the present optical lens system for taking image, with the trend of miniaturization of the optical lens system and the requirement of increasing the field of view, the focal length of the optical lens system is becoming very short. Therefore, the radius of curvature and the size of the lens elements must be very small, and it is difficult to make such glass lens elements by the use of conventional grinding. Plastic material is introduced to make lens elements by injection molding, using relatively low cost to produce high precision lens elements. The lens elements are provided with aspheric surfaces, allowing more design parameter freedom (than spherical surfaces), so as to better reduce the aberration and the number of the lens elements, thus effectively reducing the total track length of the optical lens system.

According to another aspect of the present invention, in the present optical lens system for taking image, the focal length of the first lens element is f1, the focal length of the optical lens system for taking image is f, and they satisfy the relation:

$$1.1 < f/f1 < 2.0.$$

If f/f1 satisfies the above relation, the refractive power of the first lens element is more balanced, thus allowing effective control of the total track length of the optical lens system, so as to maintain the objective of miniaturization of the optical lens system for taking image. Meanwhile, it can also prevent the excessive increase of high order spherical aberration and coma of the system, improving the image quality of the optical lens system. Further, it will be better if f/f1 satisfies the relation:

$$1.1 < f/f1 < 1.4.$$

According to another aspect of the present invention, in the present optical lens system for taking image, the focal length of the second lens element is f2, the focal length of the optical lens system for taking image is f, and they satisfy the relation:

$$-2.5 < f/f2 < -0.7.$$

If f/f2 satisfies the above relation, it will be favorable to correct the chromatic aberration of magnification and the Petzval sum caused by the optical lens system.

According to another aspect of the present invention, in the present optical lens system for taking image, the focal length of the third lens element is f3, the focal length of the optical lens system for taking image is f, and they satisfy the relation:

$$0.6 < f/f3 < 0.8.$$

The third lens element has positive refractive power and serves to distribute the refractive power of the optical lens system so that if f/f3 satisfies the above relation, the distribution of the refractive power of the optical lens system is more balanced and sensitivity of the optical lens system is reduced.

According to another aspect of the present invention, in the present optical lens system for taking image, the focal length of the fourth lens element is f4, the focal length of the fifth lens element is f5, the focal length of the optical lens system for taking image is f, and they satisfy the relations:

$$0 < f/f4 < 0.8;$$

$$-2.0 < f/f5 < -0.75.$$

If f/f4 and f/f5 satisfy the above relations, the fourth lens element and the fifth lens element serve as correction lens elements to balance and correct various aberrations caused by the optical lens system, it will be favorable to correct the astigmatism and the distortion caused by the optical lens system, improving the resolution of the optical lens system. Further, it will be better if f/f4 satisfies the relation:

$$0.0 < f/f4 < 0.3.$$

Further, it will be much better if f/f4 satisfies the relation:

$$0.03 < f/f4 < 0.2.$$

According to another aspect of the present invention, in the present optical lens system for taking image, the radius of curvature of the object-side surface of the first lens element is R1, the radius of curvature of the image-side surface of the first lens element is R2, and they satisfy the relation:

$$R1/R2 > -0.22.$$

If R1/R2 satisfies the above relation, it will be favorable to correct the spherical aberration caused by the system. Further, it will be better if R1/R2 satisfies the relation:

$$-0.2 < R1/R2 < 0.3.$$

According to another aspect of the present invention, in the present optical lens system for taking image, the radius of curvature of the object-side surface of the fourth lens element is R7, the radius of curvature of the image-side surface of the fourth lens element is R8, the radius of curvature of the object-side surface of the fifth lens element is R9, the radius of curvature of the image-side surface of the fifth lens element is R10, and they satisfy the relations:

$$0 < R7/R8 < 1.6;$$

$$2.0 < R9/R10 < 4.0.$$

If R7/R8 and R9/R10 satisfy the above relations, the fourth lens element and the fifth lens element serve as correction lens elements, and it will be favorable to correct the high order aberration of the system, improving the image quality of the optical lens system.

According to another aspect of the present invention, in the present optical lens system for taking image, the Abbe number of the first lens element is V1, the Abbe number of the second lens element is V2, the Abbe number of the third lens element is V3, the Abbe number of the fourth lens element is V4, and they satisfy the relations:

$$50 < V1 < 58;$$

$$40 < V4 < 70;$$

$$V1 - V2 > 15;$$

$$V3 - V2 > 15.$$

If V1, V2, V3 and V4 satisfy the above relations, it will be favorable to correct the chromatic aberration caused by the optical lens system, improving the resolution of the optical lens system.

According to another aspect of the present invention, in the present optical lens system for taking image, the Abbe number of the fourth lens element is V4, the Abbe number of the fifth lens element is V5, and they satisfy the relation:

$$|V4 - V5| < 15.$$

If V4 and V5 satisfy the above relation, it will be favorable to correct the astigmatism caused by the optical lens system.

According to another aspect of the present invention, in the present optical lens system for taking image, the edge thickness of the fourth lens element is ET4, the center thickness of the fourth lens element is CT4, and they satisfy the relation:

$$0.6 < ET4/CT4 < 1.0.$$

The edge thickness is defined as: the length projected on the optical axis by the distance between points at the effective diameters the object-side and the image-side surfaces of the lens element. If ET4/CT4 satisfies the above relation, plastic lens elements made from injection molding can be reliably molded and have good material uniformity, and it will be favorable to maintain the image quality and stability of the optical lens system.

According to another aspect of the present invention, in the present optical lens system for taking image, the on-axis distance between the first lens element and the second lens element is T12, the focal length of the optical lens system for taking image is f, and they satisfy the relation:

$$0.4 < (T12/f)*100 < 15.$$

The above relation can allow better correction of the astigmatism of the system.

According to another aspect of the present invention, in the present optical lens system for taking image, an object to be photographed is imaged on an electronic imaging sensor, the total track length of the optical lens system for taking image is TTL, which is defined as the distance from the object-side surface of the first lens element to the image plane along the optical axis, the maximum image height of the optical lens system for taking image is ImgH, and they satisfy the relation:

$$TTL/ImgH < 2.05.$$

The above relation can maintain the objective of miniaturization of the optical lens system for taking image.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1A:
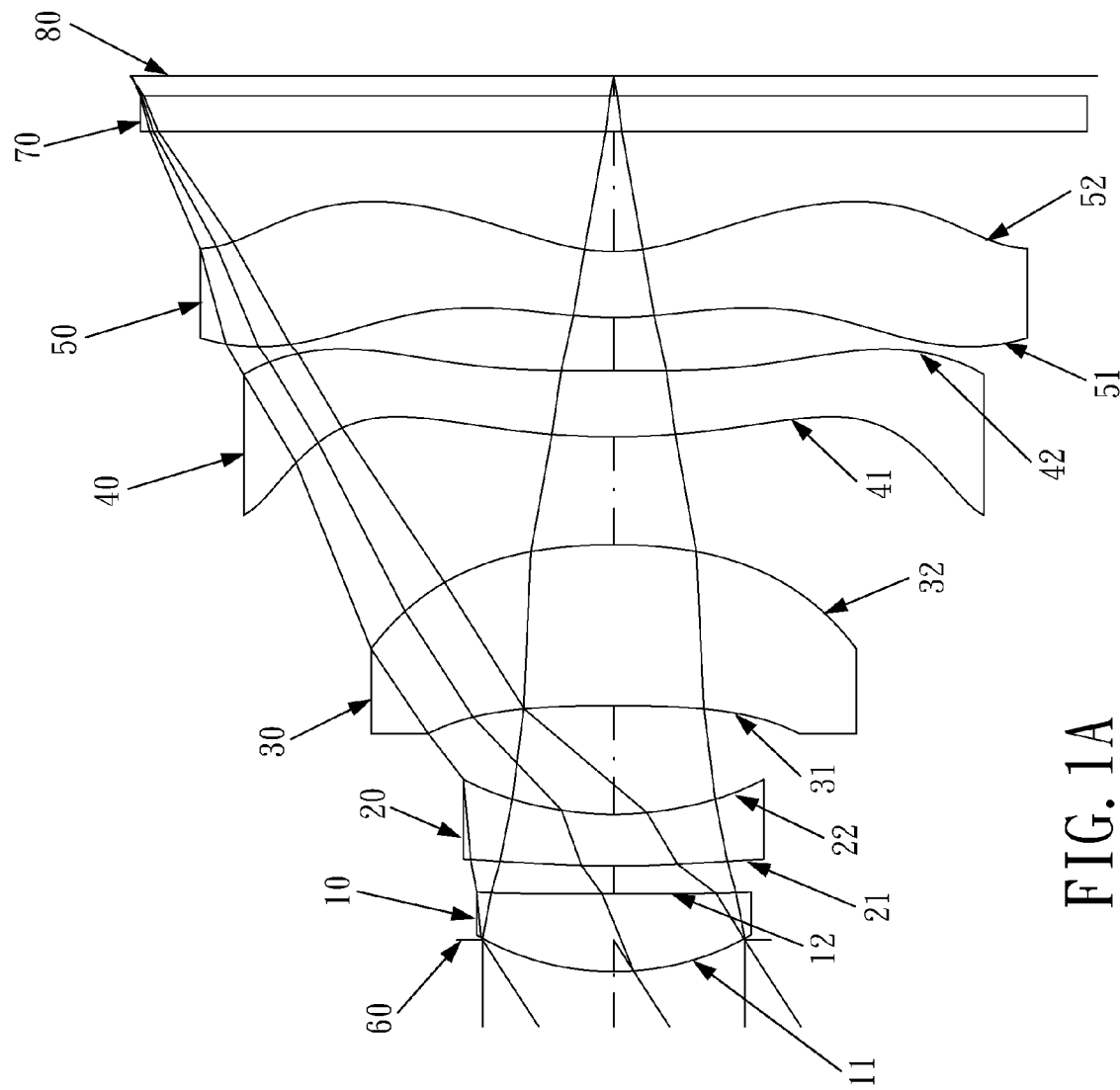
FIG. 1A shows an optical lens system for taking image in accordance with a first embodiment of the present invention.
Figure 1B:
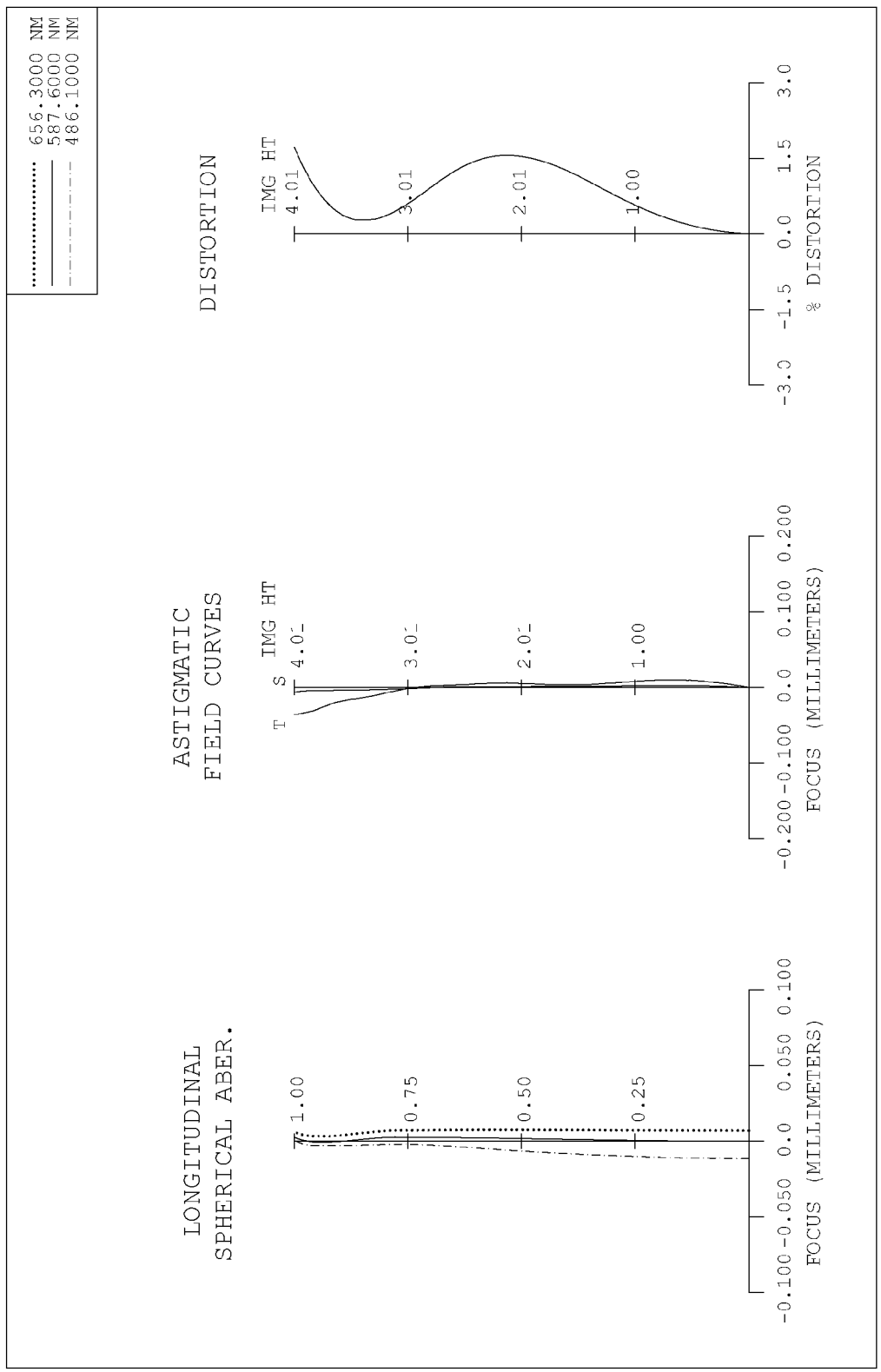
FIG. 1B shows the aberration curves of the first embodiment of the present invention.

Referring to FIG. 1A, which shows an optical lens system for taking image in accordance with a first embodiment of the present invention, and FIG. 1B shows the aberration curves of the first embodiment of the present invention. An optical lens system for taking image in accordance with the first embodiment of the present invention comprises: in order from the object side to the image side:

A plastic first lens element 10 with positive refractive power has a convex object-side surface 11 and a concave image-side surface 12, and the object-side surface 11 and the image-side surface 12 of the first lens element 10 are aspheric.

A plastic second lens element 20 with negative refractive power has a convex object-side surface 21 and a concave image-side surface 22, and the object-side surface 21 and the image-side surface 22 of the second lens element 20 are aspheric.

A plastic third lens element 30 with positive refractive power has a concave object-side surface 31 and a convex image-side surface 32, and the object-side surface 31 and the image-side surface 32 of the third lens element 30 are aspheric.

A plastic fourth lens element 40 with positive refractive power has a convex object-side surface 41 and a concave image-side surface 42, the object-side surface 41 and the image-side surface 42 of the fourth lens element 40 are aspheric, and inflection points are formed on the object-side surface 41 and the image-side surface 42 of the fourth lens element 40.

A plastic fifth lens element 50 with negative refractive power has a convex object-side surface 51 and a concave image-side surface 52, the object-side surface 51 and the image-side surface 52 of the fifth lens element 50 are aspheric, and inflection points are formed on the object-side surface 51 and the image-side surface 52 of the fifth lens element 50.

An aperture stop 60.

An IR cut filter 70 is located behind the fifth lens element 50 and has no influence on the focal length of the optical lens system.

An image plane 80 is located behind the IR cut filter 70.

The equation for the aspheric surface profiles of the first embodiment is expressed as follows:

$$X(Y) = (Y^2/R)/\left(1 + \operatorname{sqrt}\left(1 - (1+k)*(Y/R)^2\right)\right) + \sum_i (Ai)*(Y^i)$$

wherein:

X: the height of a point on the aspheric lens surface at a distance Y from the optical axis relative to the tangential plane at the aspheric surface vertex;

Y: the distance from the point on the curve of the aspheric surface to the optical axis;

k: the conic coefficient;

Ai: the aspheric surface coefficient of order i.

In the first embodiment of the present optical lens system for taking image, the focal length of the optical lens system for taking image is f, the focal length of the first lens element is f1, the focal length of the second lens element is f2, the focal length of the third lens element is f3, the focal length of the fourth lens element is f4, the focal length of the fifth lens element is f5, and they satisfy the relations:

f=6.17 mm;

f/f1=1.35;

f/f2=−0.89;

f/f3=0.50;

f/f4=0.50;

f/f5=−1.06.

In the first embodiment of the present optical lens system for taking image, the focal length of the optical lens system for taking image is f, the on-axis distance between the first lens element and the second lens element is T12, and they satisfy the relation:

(T12/f)*100=3.8.

In the first embodiment of the present optical lens system for taking image, the Abbe number of the first lens element is V1, the Abbe number of the second lens element is V2, the Abbe number of the third lens element is V3, the Abbe number of the fourth lens element is V4, the Abbe number of the fifth lens element is V5, and they satisfy the relations:

V1=55.9;

V4=55.9;

V1−V2=32.5;

V3−V2=32.5;

|V4−V5|=0.0.

In the first embodiment of the present optical lens system for taking image, the radius of curvature of the object-side surface of the first lens element is R1, the radius of curvature of the image-side surface of the first lens element is R2, the radius of curvature of the object-side surface of the fourth lens element is R7, the radius of curvature of the image-side surface of the fourth lens element is R8, the radius of curvature of the object-side surface of the fifth lens element is R9, the radius of curvature of the image-side surface of the fifth lens element is R10, and they satisfy the relations:

R1/R2=0.05;

R7/R8=0.06;

R9/R10=2.15.

In the first embodiment of the present optical lens system for taking image, the edge thickness of the fourth lens element is ET4, the center thickness of the fourth lens element is CT4, and they satisfy the relation:

ET4/CT4=1.34.

In the first embodiment of the present optical lens system for taking image, an object to be photographed is imaged on an electronic imaging sensor, the total track length of the optical lens system for taking image is TTL, the maximum image height of the optical lens system for taking image is ImgH, and they satisfy the relation:

TTL/ImgH=1.83.

The detailed optical data of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f (focal length) = 6.17 mm, Fno = 2.8, HFOV (half of field of view) = 32.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.259 | | | | |
| 2 | Lens 1 | 2.37429(ASP) | 0.644 | Plastic | 1.544 | 55.9 | 4.56 |
| 3 | | 50.00000(ASP) | 0.232 | | | | |
| 4 | Lens 2 | 7.36880(ASP) | 0.432 | Plastic | 1.632 | 23.4 | −6.96 |
| 5 | | 2.69229(ASP) | 0.908 | | | | |
| 6 | Lens 3 | −13.41500(ASP) | 1.341 | Plastic | 1.544 | 55.9 | 12.25 |
| 7 | | −4.61080(ASP) | 0.900 | | | | |
| 8 | Lens 4 | 6.26220(ASP) | 0.550 | Plastic | 1.544 | 55.9 | 12.25 |
| 9 | | 100.00000(ASP) | 0.444 | | | | |
| 10 | Lens 5 | 3.22820(ASP) | 0.550 | Plastic | 1.544 | 55.9 | −5.8 |
| 11 | | 1.49953(ASP) | 1.000 | | | | |
| 12 | IR-filter | Plano | 0.300 | Glass | 1.517 | 64.2 | |
| 13 | | Plano | 0.166 | | | | |
| 14 | Image | Plano | | | | | |

TABLE 2

Aspheric Coefficients

| | Surface # | | | | |
|---|---|---|---|---|---|
| | 2 | 3 | 4 | 5 | 6 |
| k = | 3.40090E−02 | −1.00000E+00 | −2.00000E+01 | −4.45409E+00 | −1.00000E+00 |
| A4 = | 2.50978E−03 | −9.81798E−03 | −3.58117E−02 | −1.98788E−03 | −2.41609E−02 |
| A6 = | 2.31356E−03 | 1.23680E−02 | 2.27808E−02 | 1.86376E−02 | 2.78124E−03 |
| A8 = | −1.13159E−03 | −5.75426E−03 | −7.30419E−03 | −5.58513E−03 | −3.13369E−03 |
| A10 = | −1.00178E−03 | 2.00255E−03 | 6.73836E−04 | 1.34068E−03 | 9.15396E−04 |
| A12 = | 6.22089E−06 | | | | −3.87372E−06 |
| A14 = | | | | | −8.79048E−05 |
| A16 = | | | | | 2.24027E−05 |

| | Surface # | | | | |
|---|---|---|---|---|---|
| | 7 | 8 | 9 | 10 | 11 |
| k = | 3.10292E+00 | −1.98506E+00 | −1.00000E+00 | −2.00000E+01 | −4.75840E+00 |
| A4 = | −2.60898E−02 | −1.67843E−03 | 2.94138E−02 | −4.33989E−02 | −2.99692E−02 |
| A6 = | 5.44466E−03 | −1.65151E−03 | −7.08821E−03 | 6.34038E−03 | 4.66959E−03 |
| A8 = | −1.21992E−03 | −1.33350E−04 | 5.71459E−04 | −3.53977E−04 | −5.27592E−04 |
| A10 = | 1.18896E−04 | 7.52355E−07 | −1.52177E−05 | 7.34318E−06 | 2.14947E−05 |
| A12 = | | 1.66254E−06 | −1.86400E−07 | | 8.04115E−07 |
| A14 = | | | | | −5.49145E−08 |

Figure 2A:
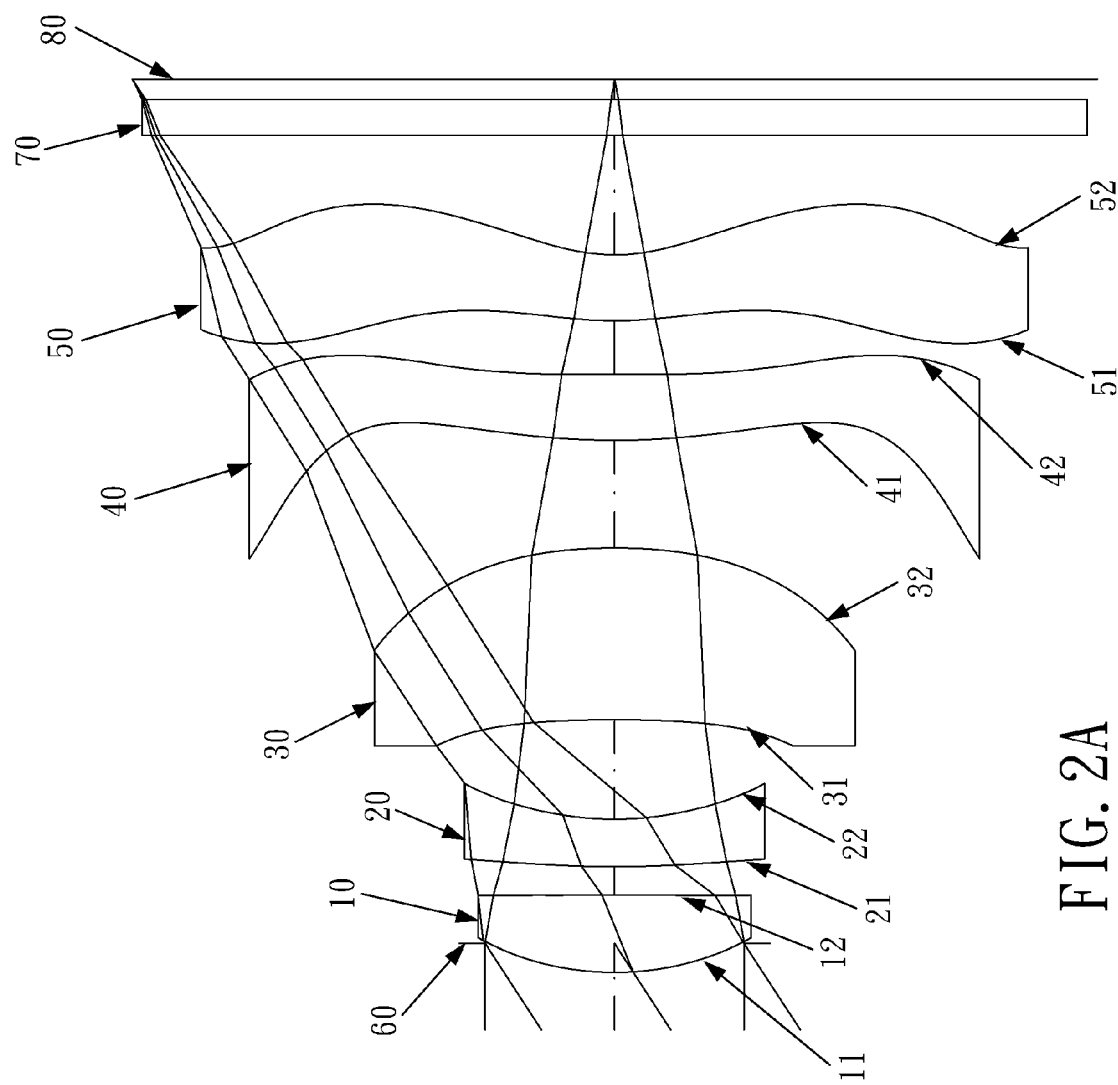
FIG. 2A shows an optical lens system for taking image in accordance with a second embodiment of the present invention.
Figure 2B:
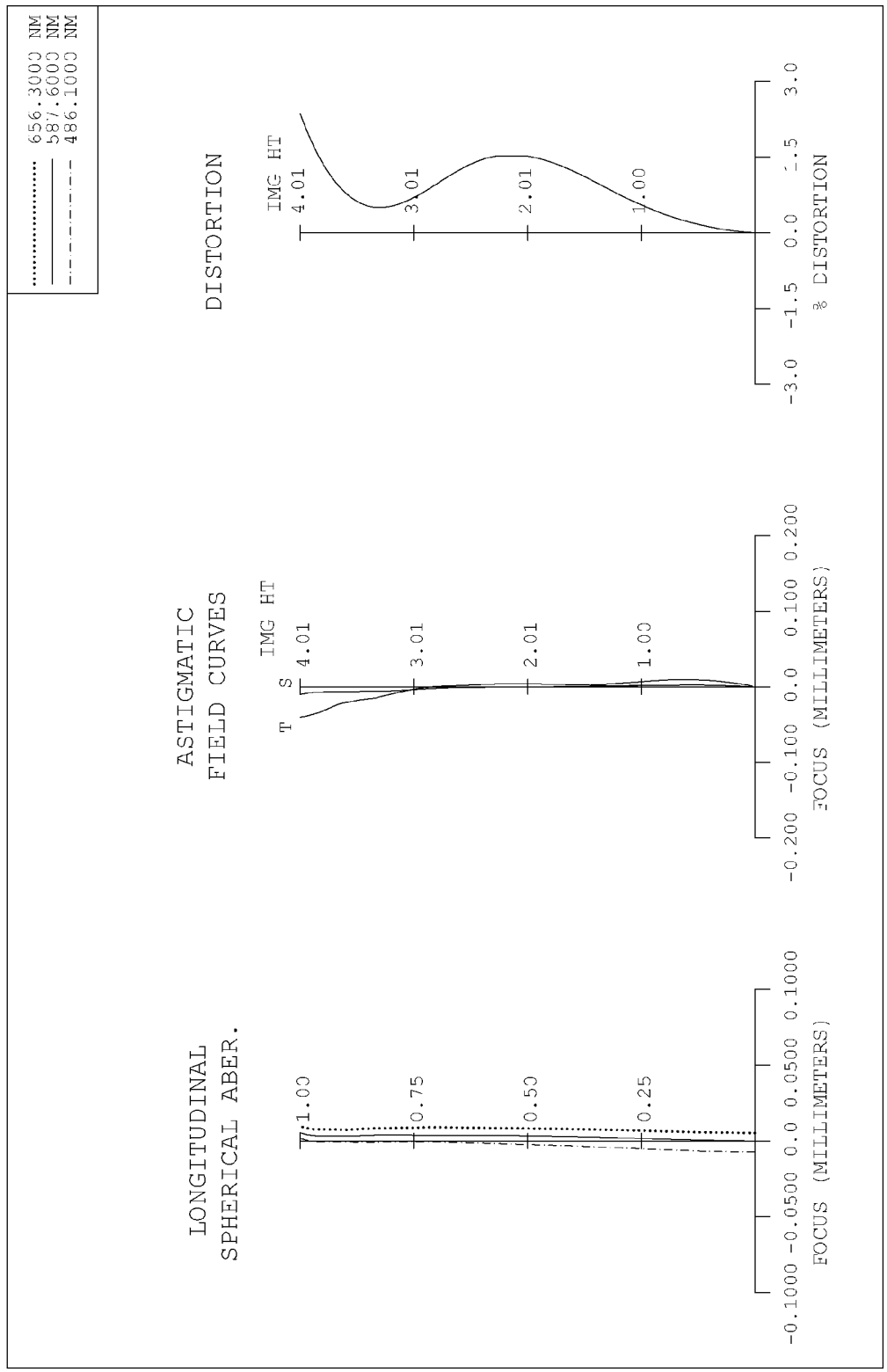
FIG. 2B shows the aberration curves of the second embodiment of the present invention.

Referring to FIG. 2A, which shows an optical lens system for taking image in accordance with a second embodiment of the present invention, and FIG. 2B shows the aberration curves of the second embodiment of the present invention. The second embodiment of the present invention comprises: in order from the object side to the image side:

A plastic first lens element 10 with positive refractive power has a convex object-side surface 11 and a convex image-side surface 12, and the object-side surface 11 and the image-side surface 12 of the first lens element 10 are aspheric.

A plastic second lens element 20 with negative refractive power has a convex object-side surface 21 and a concave image-side surface 22, and the object-side surface 21 and the image-side surface 22 of the second lens element 20 are aspheric.

A plastic third lens element 30 with positive refractive power has a concave object-side surface 31 and a convex image-side surface 32, and the object-side surface 31 and the image-side surface 32 of the third lens element 30 are aspheric.

A plastic fourth lens element 40 with positive refractive power has a convex object-side surface 41 and a concave image-side surface 42, the object-side surface 41 and the image-side surface 42 of the fourth lens element 40 are aspheric, and inflection points are formed on the object-side surface 41 and the image-side surface 42 of the fourth lens element 40.

A plastic fifth lens element 50 with negative refractive power has a convex object-side surface 51 and a concave image-side surface 52, the object-side surface 51 and the image-side surface 52 of the fifth lens element 50 are aspheric, and inflection points are formed on the object-side surface 51 and the image-side surface 52 of the fifth lens element 50.

An aperture stop 60.

An IR cut filter 70 is located behind the fifth lens element 50 and has no influence on the focal length of the optical lens system.

An image plane 80 is located behind the IR cut filter 70.

The equation for the aspheric surface profiles of the second embodiment has the same form as that of the first embodiment.

In the second embodiment of the present optical lens system for taking image, the focal length of the optical lens system for taking image is f, the focal length of the first lens element is f1, the focal length of the second lens element is f2, the focal length of the third lens element is f3, the focal length of the fourth lens element is f4, the focal length of the fifth lens element is f5, and they satisfy the relations:

$f=6.10$ mm;

$f/f1=1.40$;

$f/f2=-0.94$;

$f/f3=0.50$;

$f/f4=0.50$;

$f/f5=-1.05$.

In the second embodiment of the present optical lens system for taking image, the focal length of the optical lens system for taking image is f, the on-axis distance between the first lens element and the second lens element is T12, and they satisfy the relation:

$(T12/f)*100=3.9$.

In the second embodiment of the present optical lens system for taking image, the Abbe number of the first lens element is V1, the Abbe number of the second lens element is V2, the Abbe number of the third lens element is V3, the Abbe number of the fourth lens element is V4, the Abbe number of the fifth lens element is V5, and they satisfy the relations:

$V1=55.9$;

$V4=55.9$;

$V1-V2=32.5$;

$V3-V2=32.5$;

$|V4-V5|=0.0$.

In the second embodiment of the present optical lens system for taking image, the radius of curvature of the object-side surface of the first lens element is R1, the radius of curvature of the image-side surface of the first lens element is R2, the radius of curvature of the object-side surface of the fourth lens element is R7, the radius of curvature of the image-side surface of the fourth lens element is R8, the radius of curvature of the object-side surface of the fifth lens element is R9, the radius of curvature of the image-side surface of the fifth lens element is R10, and they satisfy the relations:

$R1/R2=-0.03$;

$R7/R8=0.06$;

$R9/R10=2.15$.

In the second embodiment of the present optical lens system for taking image, the edge thickness of the fourth lens element is ET4, the center thickness of the fourth lens element is CT4, and they satisfy the relation:

$ET4/CT4=1.40$.

In the second embodiment of the present optical lens system for taking image, an object to be photographed is imaged on an electronic imaging sensor, the total track length of the optical lens system for taking image is TTL, the maximum image height of the optical lens system for taking image is ImgH, and they satisfy the relation:

$TTL/ImgH=1.84$.

The detailed optical data of the second embodiment is shown in table 3, and the aspheric surface data is shown in table 4, wherein the units of the radius of curvature, the thickness and the focal length are expressed in mm, and HFOV is half of the maximal field of view.

TABLE 3

(Embodiment 2)
f (focal length) = 6.10 mm, Fno = 2.8, HFOV (half of field of view) = 33.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.241 | | | | |
| 2 | Lens 1 | 2.44488(ASP) | 0.644 | Plastic | 1.544 | 55.9 | 4.36 |
| 3 | | −73.06540(ASP) | 0.236 | | | | |
| 4 | Lens 2 | 7.45920(ASP) | 0.398 | Plastic | 1.632 | 23.4 | −6.47 |
| 5 | | 2.58696(ASP) | 0.833 | | | | |
| 6 | Lens 3 | −12.41340(ASP) | 1.437 | Plastic | 1.544 | 55.9 | 12.13 |
| 7 | | −4.48430(ASP) | 0.900 | | | | |
| 8 | Lens 4 | 6.20130(ASP) | 0.550 | Plastic | 1.544 | 55.9 | 12.12 |
| 9 | | 100.00000(ASP) | 0.451 | | | | |

TABLE 3-continued (Embodiment 2)
f (focal length) = 6.10 mm, Fno = 2.8, HFOV (half of field of view) = 33.0 deg.

| Surface # | | Curvature Radius | Thickness | Material | Index | Abbe # | Focal length |
|---|---|---|---|---|---|---|---|
| 10 | Lens 5 | 3.20620(ASP) | 0.550 | Plastic | 1.544 | 55.9 | −5.8 |
| 11 | | 1.49407(ASP) | 1.000 | | | | |
| 12 | IR-filter | Plano | 0.300 | Glass | 1.517 | 64.2 | |
| 13 | | Plano | 0.169 | | | | |
| 14 | Image | Plano | | | | | |

TABLE 4

Aspheric Coefficients

| | Surface # | | | | |
|---|---|---|---|---|---|
| | 2 | 3 | 4 | 5 | 6 |
| k = | 3.38122E−02 | −1.00000E+00 | −1.40371E+01 | −5.14920E+00 | −1.00000E+00 |
| A4 = | 2.11948E−03 | −1.54572E−03 | −3.05302E−02 | 4.46480E−03 | −2.44065E−02 |
| A6 = | 2.02621E−03 | 7.30303E−03 | 2.14143E−02 | 1.51417E−02 | 2.69142E−03 |
| A8 = | −1.61461E−03 | −4.01875E−03 | −8.90922E−03 | −5.52371E−03 | −3.13728E−03 |
| A10 = | 1.32164E−03 | 1.00104E−03 | 1.39261E−03 | 1.44236E−03 | 8.74639E−04 |
| A12 = | −3.04095E−04 | | | | −1.99496E−05 |
| A14 = | | | | | −6.92919E−05 |
| A16 = | | | | | 1.61802E−05 |

| | Surface # | | | | |
|---|---|---|---|---|---|
| | 7 | 8 | 9 | 10 | 11 |
| k = | 3.04737E+00 | −1.50822E+00 | −1.00000E+00 | −2.00000E+01 | −4.73967E+00 |
| A4 = | −2.61194E−02 | −4.81459E−03 | 2.78069E−02 | −4.14348E−02 | −2.91332E−02 |
| A6 = | 5.88506E−03 | −1.27033E−03 | −6.78690E−03 | 6.10713E−03 | 4.49182E−03 |
| A8 = | −1.28127E−03 | −1.82527E−04 | 5.26123E−04 | −3.43903E−04 | −5.12035E−04 |
| A10 = | 1.29545E−04 | −3.30863E−07 | −1.03816E−05 | 7.37507E−06 | 2.11024E−05 |
| A12 = | | 1.69518E−06 | −3.91121E−07 | | 7.79136E−07 |
| A14 = | | | | | −5.30319E−08 |

Figure 3A:
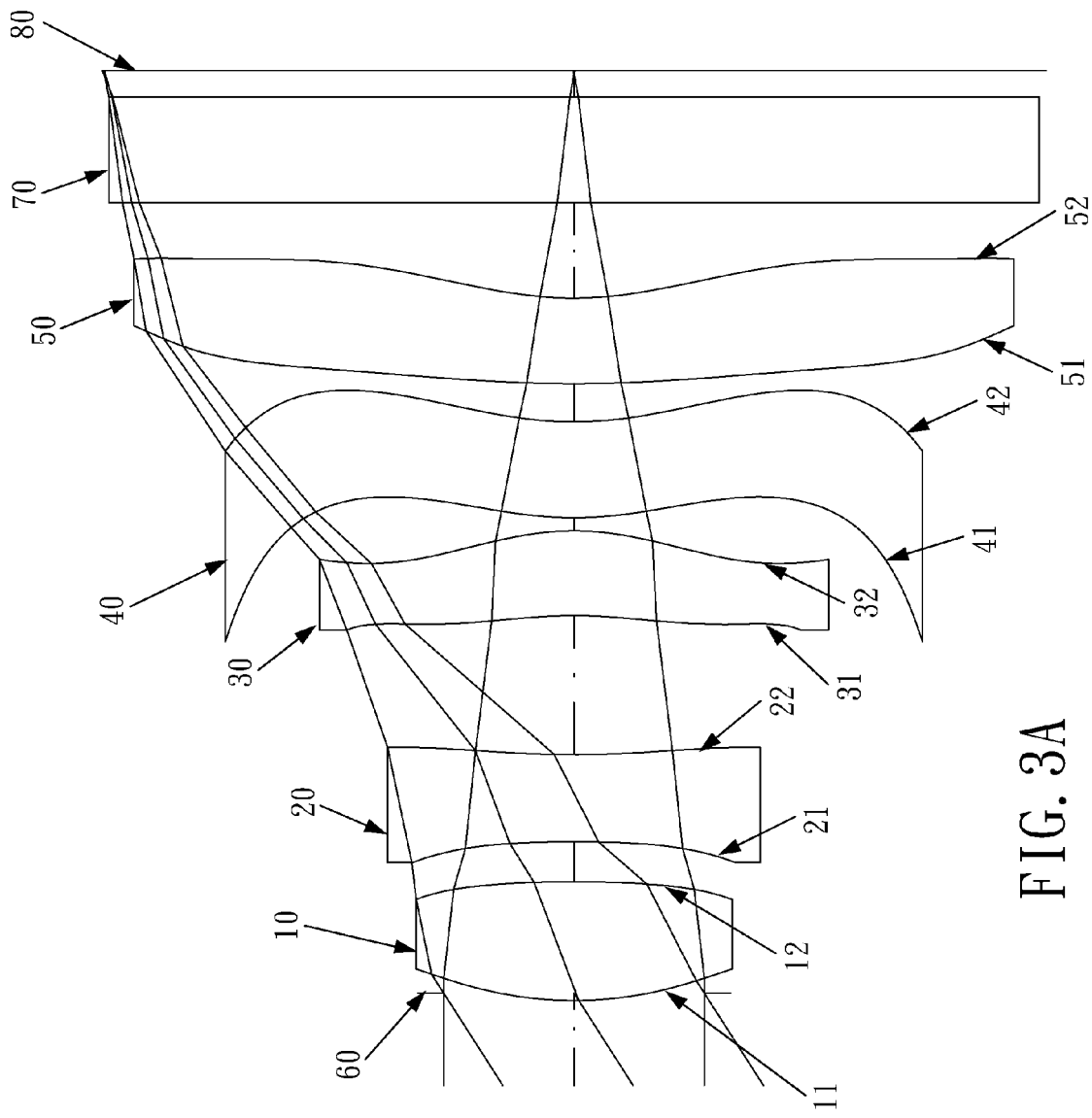
FIG. 3A shows an optical lens system for taking image in accordance with a third embodiment of the present invention.
Figure 3B:
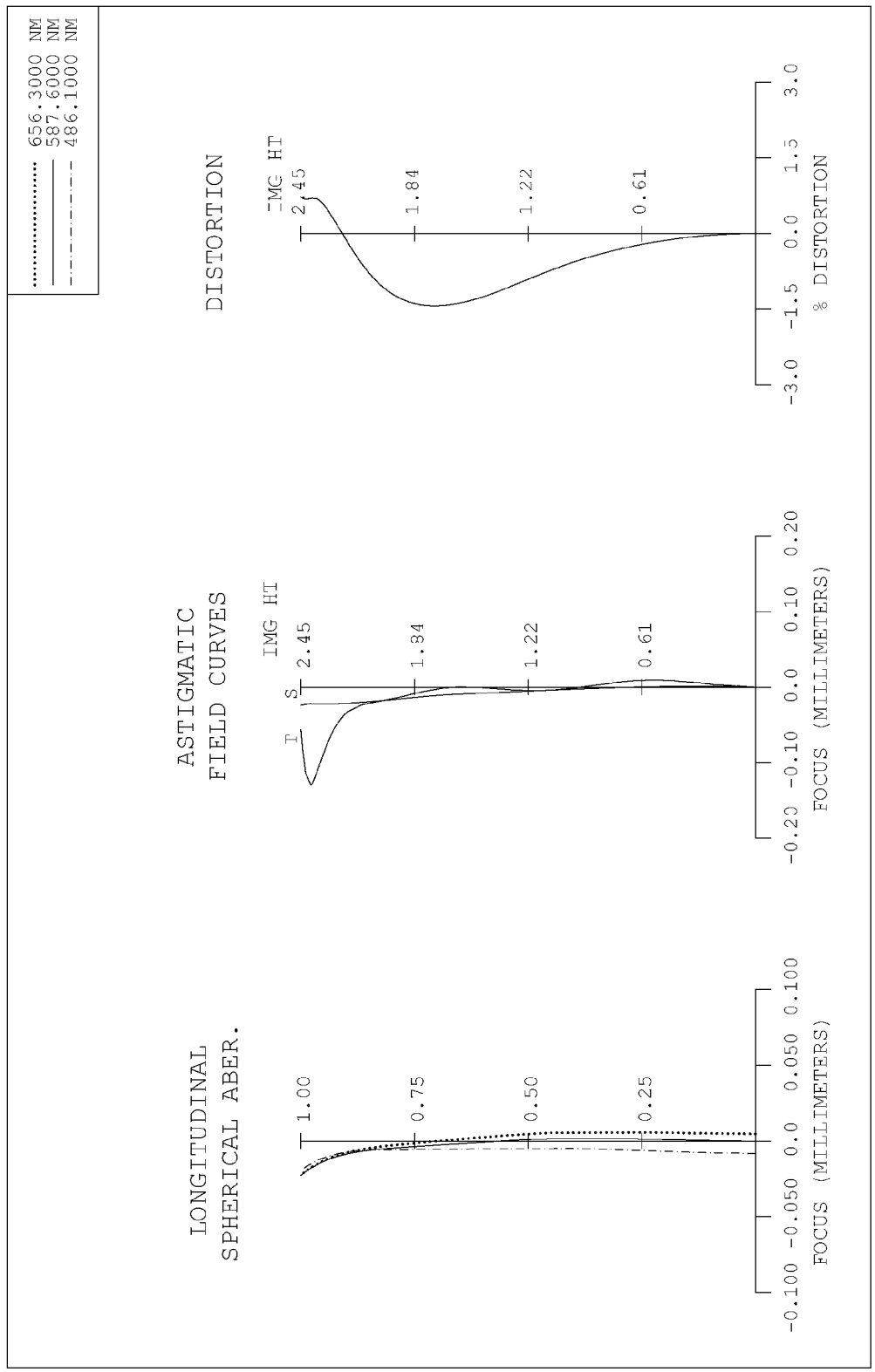
FIG. 3B shows the aberration curves of the third embodiment of the present invention.

Referring to FIG. 3A, which shows an optical lens system for taking image in accordance with a third embodiment of the present invention, FIG. 3B shows the aberration curves of the third embodiment of the present invention. The third embodiment of the present invention comprises: in order from the object side to the image side:

A plastic first lens element 10 with positive refractive power has a convex object-side surface 11 and a convex image-side surface 12, and the object-side surface 11 and the image-side surface 12 of the first lens element 10 are aspheric.

A plastic second lens element 20 with negative refractive power has a concave object-side surface 21 and a concave image-side surface 22, and the object-side surface 21 and the image-side surface 22 of the second lens element 20 are aspheric.

A plastic third lens element 30 with positive refractive power has a concave object-side surface 31 and a convex image-side surface 32, and the object-side surface 31 and the image-side surface 32 of the third lens element 30 are aspheric.

A plastic fourth lens element 40 with positive refractive power has a convex object-side surface 41 and a concave image-side surface 42, the object-side surface 41 and the image-side surface 42 of the fourth lens element 40 are aspheric, and inflection points are formed on the object-side surface 41 and the image-side surface 42 of the fourth lens element 40.

A plastic fifth lens element 50 with negative refractive power has a convex object-side surface 51 and a concave image-side surface 52, the object-side surface 51 and the image-side surface 52 of the fifth lens element 50 are aspheric, and inflection points are formed on the object-side surface 51 and the image-side surface 52 of the fifth lens element 50.

An aperture stop 60.

An IR cut filter 70 is located behind the fifth lens element 50 and has no influence on the focal length of the optical lens system.

An image plane 80 is located behind the IR cut filter 70.

The equation for the aspheric surface profiles of the third embodiment has the same form as that of the first embodiment.

In the third embodiment of the present optical lens system for taking image, the focal length of the optical lens system for taking image is f, the focal length of the first lens element is f1, the focal length of the second lens element is f2, the focal length of the third lens element is f3, the focal length of the fourth lens element is f4, the focal length of the fifth lens element is f5, and they satisfy the relations:

$f = 3.82$ mm;

$f/f1 = 1.34$;

$f/f2 = -0.80$;

$f/f3=0.68$;

$f/f4=0.07$;

$f/f5=-0.81$.

In the third embodiment of the present optical lens system for taking image, the focal length of the optical lens system for taking image is f, the on-axis distance between the first lens element and the second lens element is T12, and they satisfy the relation:

$(T12/f)*100=5.4$.

In the third embodiment of the present optical lens system for taking image, the Abbe number of the first lens element is V1, the Abbe number of the second lens element is V2, the Abbe number of the third lens element is V3, the Abbe number of the fourth lens element is V4, the Abbe number of the fifth lens element is V5, and they satisfy the relations:

$V1=55.9$;

$V4=55.9$;

$V1-V2=32.5$;

$V3-V2=32.5$;

$|V4-V5|=0.1$.

In the third embodiment of the present optical lens system for taking image, the radius of curvature of the object-side surface of the first lens element is R1, the radius of curvature of the image-side surface of the first lens element is R2, the radius of curvature of the object-side surface of the fourth lens element is R7, the radius of curvature of the image-side surface of the fourth lens element is R8, the radius of curvature of the object-side surface of the fifth lens element is R9, the radius of curvature of the image-side surface of the fifth lens element is R10, and they satisfy the relations:

$R1/R2=-0.30$;

$R7/R8=1.03$;

$R9/R10=3.92$.

In the third embodiment of the present optical lens system for taking image, the edge thickness of the fourth lens element is ET4, the center thickness of the fourth lens element is CT4, and they satisfy the relation:

$ET4/CT4=0.80$.

In the third embodiment of the present optical lens system for taking image, an object to be photographed is imaged on an electronic imaging sensor, the total track length of the optical lens system for taking image is TTL, the maximum image height of the optical lens system for taking image is ImgH, and they satisfy the relation:

$TTL/ImgH=1.91$.

The detailed optical data of the third embodiment is shown in table 5, and the aspheric surface data is shown in table 6, wherein the units of the radius of curvature, the thickness and the focal length are expressed in mm, and HFOV is half of the maximal field of view.

TABLE 5

(Embodiment 3)
f (focal length) = 3.82 mm, Fno = 2.8, HFOV (half of field of view) = 32.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.038 | | | | |
| 2 | Lens 1 | 1.97505(ASP) | 0.619 | Plastic | 1.544 | 55.9 | 2.86 |
| 3 | | −6.50090(ASP) | 0.208 | | | | |
| 4 | Lens 2 | −6.57340(ASP) | 0.457 | Plastic | 1.632 | 23.4 | −4.77 |
| 5 | | 5.72860(ASP) | 0.726 | | | | |
| 6 | Lens 3 | −2.46821(ASP) | 0.442 | Plastic | 1.544 | 55.9 | 5.63 |
| 7 | | −1.45351(ASP) | 0.070 | | | | |
| 8 | Lens 4 | 1.92135(ASP) | 0.500 | Plastic | 1.544 | 55.9 | 53.39 |
| 9 | | 1.86875(ASP) | 0.200 | | | | |
| 10 | Lens 5 | 7.03660(ASP) | 0.446 | Plastic | 1.530 | 55.8 | −4.69 |
| 11 | | 1.79673(ASP) | 0.500 | | | | |
| 12 | IR-filter | Plano | 0.550 | Glass | 1.517 | 64.2 | |
| 13 | | Plano | 0.140 | | | | |
| 14 | Image | Plano | | | | | |

TABLE 6

Aspheric Coefficients

| | Surface # | | | | |
|---|---|---|---|---|---|
| | 2 | 3 | 4 | 5 | 6 |
| k = | −9.05029E−02 | −1.00000E+00 | 1.40830E+01 | −1.67187E+01 | −4.11064E+00 |
| A4 = | −6.23356E−03 | −2.22204E−02 | −3.25962E−02 | 3.06667E−02 | 3.00032E−01 |
| A6 = | −1.00111E−02 | −1.36874E−01 | −2.53820E−01 | −2.31584E−01 | −2.30071E−01 |
| A8 = | −4.91068E−02 | 8.59699E−02 | 2.90832E−01 | 2.69048E−01 | 8.86575E−02 |
| A10 = | 1.22597E−02 | −3.83427E−02 | −8.90063E−02 | −1.41802E−01 | −1.33785E−02 |
| A12 = | | | | 3.13361E−02 | −7.34373E−03 |

TABLE 6-continued

Aspheric Coefficients

| | Surface # | | | | |
|---|---|---|---|---|---|
| | 7 | 8 | 9 | 10 | 11 |
| k = | −8.66158E−01 | −4.88703E+00 | −4.37347E+00 | −2.00000E+01 | −8.89658E+00 |
| A4 = | 1.96052E−01 | −1.32396E−01 | −8.86036E−02 | −1.27544E−02 | −4.40696E−02 |
| A6 = | 1.40082E−02 | 3.18970E−02 | 2.78597E−02 | 9.13900E−04 | 5.60032E−03 |
| A8 = | −3.62703E−02 | −5.81289E−03 | −1.12211E−02 | 3.42219E−04 | 5.90040E−04 |
| A10 = | 8.22598E−03 | −5.35146E−04 | 2.05881E−03 | 9.50879E−05 | −1.14925E−04 |
| A12 = | | | −1.87400E−04 | −1.87141E−05 | |

Figure 4A:
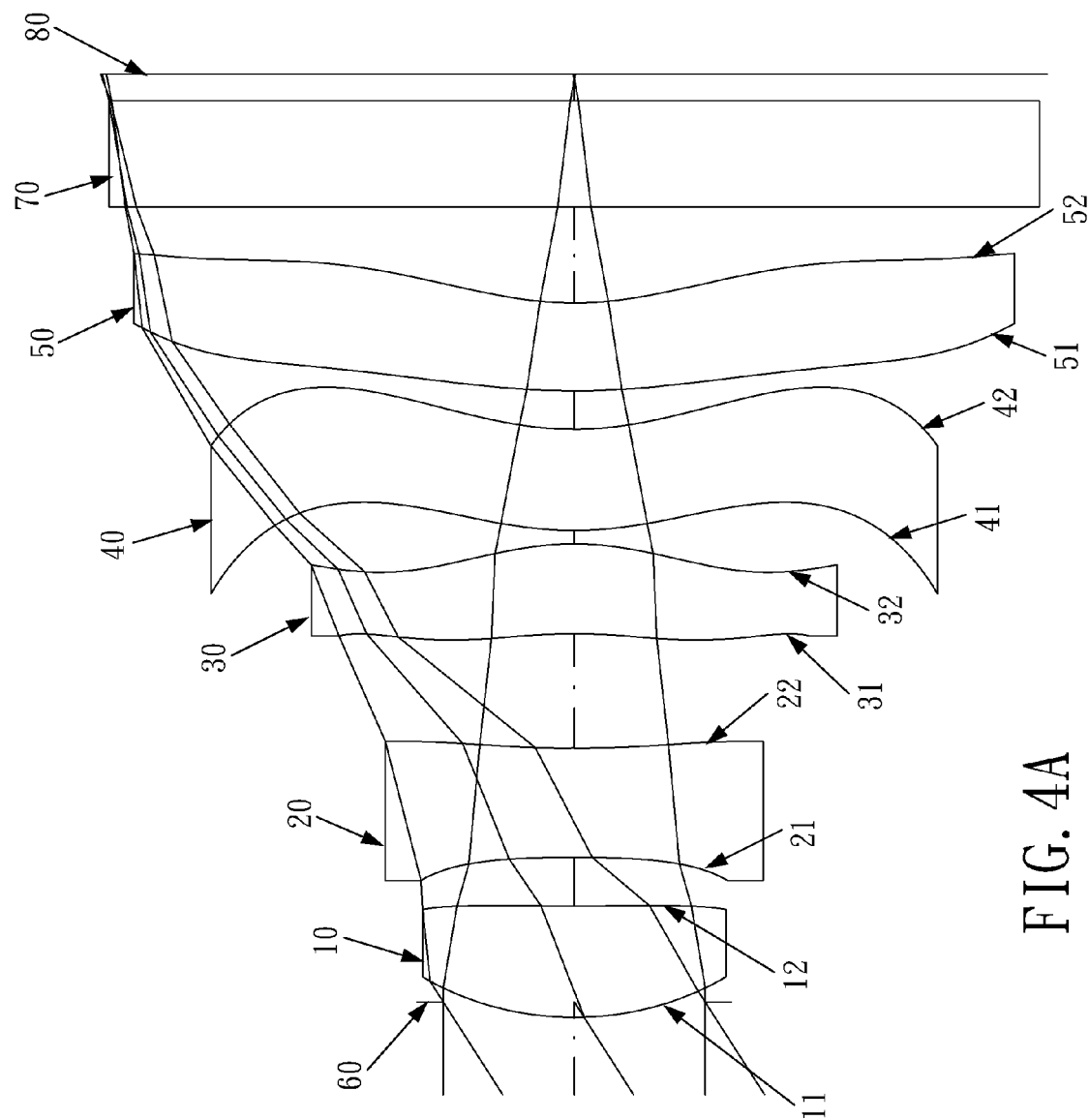
FIG. 4A shows an optical lens system for taking image in accordance with a fourth embodiment of the present invention.
Figure 4B:
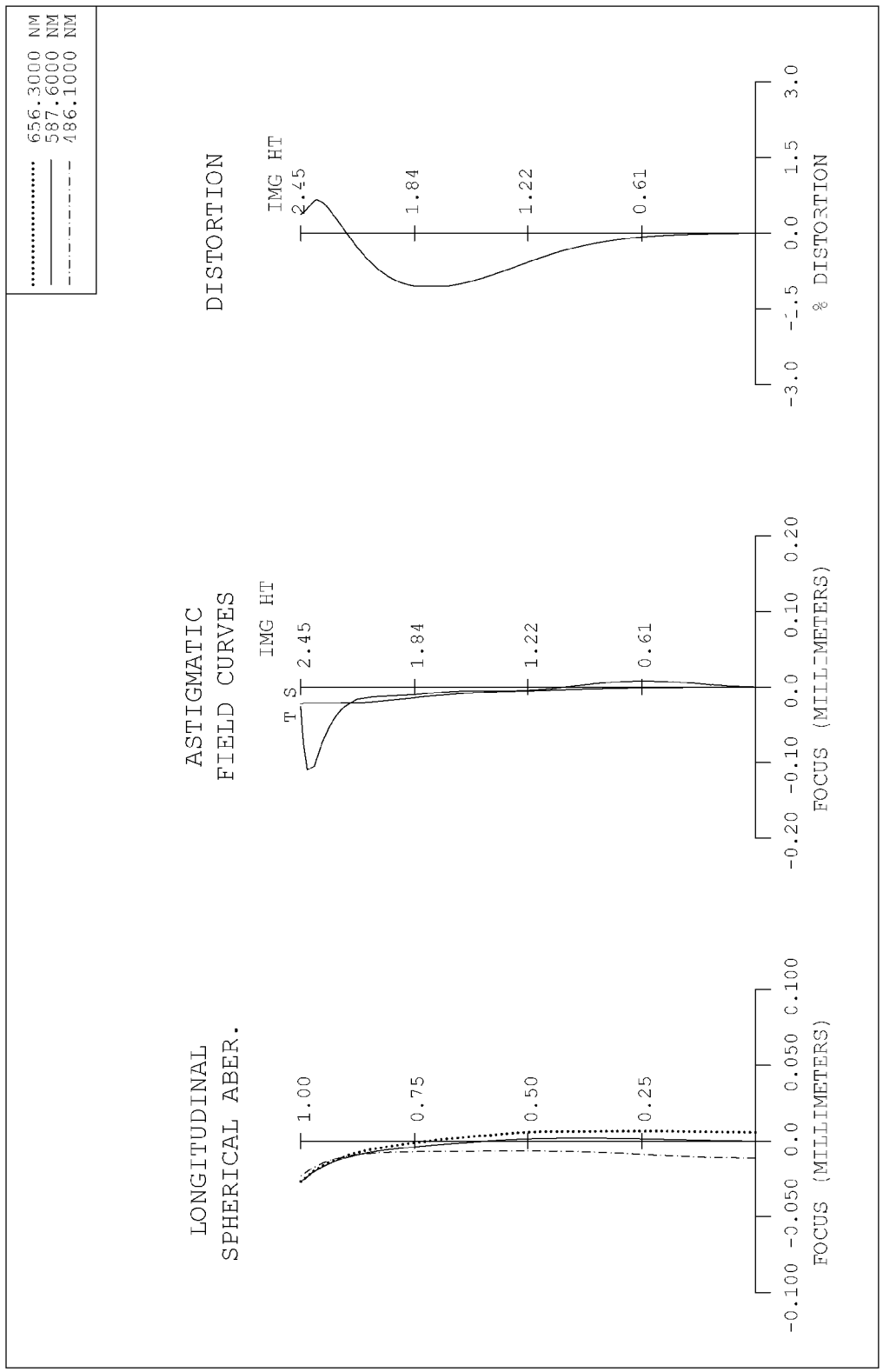
FIG. 4B shows the aberration curves of the fourth embodiment of the present invention.

Referring to FIG. 4A, which shows an optical lens system for taking image in accordance with a fourth embodiment of the present invention, FIG. 4B shows the aberration curves of the fourth embodiment of the present invention. The fourth embodiment of the present invention comprises: in order from the object side to the image side:

A plastic first lens element 10 with positive refractive power has a convex object-side surface 11 and a concave image-side surface 12, and the object-side surface 11 and the image-side surface 12 of the first lens element 10 are aspheric.

A plastic second lens element 20 with negative refractive power has a concave object-side surface 21 and a concave image-side surface 22, and the object-side surface 21 and the image-side surface 22 of the second lens element 20 are aspheric.

A plastic third lens element 30 with positive refractive power has a concave object-side surface 31 and a convex image-side surface 32, and the object-side surface 31 and the image-side surface 32 of the third lens element 30 are aspheric.

A plastic fourth lens element 40 with positive refractive power has a convex object-side surface 41 and a concave image-side surface 42, the object-side surface 41 and the image-side surface 42 of the fourth lens element 40 are aspheric, and inflection points are formed on the object-side surface 41 and the image-side surface 42 of the fourth lens element 40.

A plastic fifth lens element 50 with negative refractive power has a convex object-side surface 51 and a concave image-side surface 52, the object-side surface 51 and the image-side surface 52 of the fifth lens element 50 are aspheric, and inflection points are formed on the object-side surface 51 and the image-side surface 52 of the fifth lens element 50.

An aperture stop 60.

An IR cut filter 70 is located behind the fifth lens element 50 and has no influence on the focal length of the optical lens system.

An image plane 80 is located behind the IR cut filter 70.

The equation for the aspheric surface profiles of the fourth embodiment has the same form as that of the first embodiment.

In the fourth embodiment of the present optical lens system for taking image, the focal length of the optical lens system for taking image is f, the focal length of the first lens element is f1, the focal length of the second lens element is f2, the focal length of the third lens element is f3, the focal length of the fourth lens element is f4, the focal length of the fifth lens element is f5, and they satisfy the relations:

$f=3.82$ mm;

$f/f1=1.24$;

$f/f2=-0.78$;

$f/f3=0.65$;

$f/f4=0.05$;

$f/f5=-0.61$.

In the fourth embodiment of the present optical lens system for taking image, the focal length of the optical lens system for taking image is f, the on-axis distance between the first lens element and the second lens element is T12, and they satisfy the relation:

$(T12/f)*100=6.6$.

In the fourth embodiment of the present optical lens system for taking image, the Abbe number of the first lens element is V1, the Abbe number of the second lens element is V2, the Abbe number of the third lens element is V3, the Abbe number of the fourth lens element is V4, the Abbe number of the fifth lens element is V5, and they satisfy the relations:

$V1=55.9$;

$V4=55.9$;

$V1-V2=32.5$;

$V3-V2=32.5$;

$|V4-V5|=0.1$.

In the fourth embodiment of the present optical lens system for taking image, the radius of curvature of the object-side surface of the first lens element is R1, the radius of curvature of the image-side surface of the first lens element is R2, the radius of curvature of the object-side surface of the fourth lens element is R7, the radius of curvature of the image-side surface of the fourth lens element is R8, the radius of curvature of the object-side surface of the fifth lens element is R9, the radius of curvature of the image-side surface of the fifth lens element is R10, and they satisfy the relations:

$R1/R2=0.03$;

$R7/R8=1.07$;

$R9/R10=2.28$.

In the fourth embodiment of the present optical lens system for taking image, the edge thickness of the fourth lens element is ET4, the center thickness of the fourth lens element is CT4, and they satisfy the relation:

$ET4/CT4=0.79$.

In the fourth embodiment of the present optical lens system for taking image, an object to be photographed is imaged on an electronic imaging sensor, the total track length of the optical lens system for taking image is TTL, the maximum image height of the optical lens system for taking image is ImgH, and they satisfy the relation:

$TTL/ImgH=1.93$.

The detailed optical data of the fourth embodiment is shown in table 7, and the aspheric surface data is shown in table 8, wherein the units of the radius of curvature, the thickness and the focal length are expressed in mm, and HFOV is half of the maximal field of view.

TABLE 7

(Embodiment 4)
f (focal length) = 3.82 mm, Fno = 2.8, HFOV (half of field of view) = 32.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.080 | | | | |
| 2 | Lens 1 | 1.63090(ASP) | 0.577 | Plastic | 1.544 | 55.9 | 3.09 |
| 3 | | 50.00000(ASP) | 0.254 | | | | |
| 4 | Lens 2 | −6.26590(ASP) | 0.567 | Plastic | 1.632 | 23.4 | −4.92 |
| 5 | | 6.38450(ASP) | 0.595 | | | | |
| 6 | Lens 3 | −2.63676(ASP) | 0.467 | Plastic | 1.544 | 55.9 | 5.85 |
| 7 | | −1.53265(ASP) | 0.070 | | | | |
| 8 | Lens 4 | 1.81232(ASP) | 0.526 | Plastic | 1.544 | 55.9 | 76.98 |
| 9 | | 1.70054(ASP) | 0.200 | | | | |
| 10 | Lens 5 | 3.93580(ASP) | 0.456 | Plastic | 1.530 | 55.8 | −6.27 |
| 11 | | 1.72941(ASP) | 0.500 | | | | |
| 12 | IR-filter | Plano | 0.550 | Glass | 1.517 | 64.2 | |
| 13 | | Plano | 0.138 | | | | |
| 14 | Image | Plano | | | | | |

TABLE 8

Aspheric Coefficients

| | Surface # | | | | |
|---|---|---|---|---|---|
| | 2 | 3 | 4 | 5 | 6 |
| k = | 3.83732E−01 | −1.00000E+00 | 2.00000E+01 | −2.50576E+00 | −7.96225E+00 |
| A4 = | 6.52406E−03 | −1.26393E−03 | −6.25881E−02 | 3.71554E−02 | 3.10714E−01 |
| A6 = | 1.34131E−03 | −1.22843E−01 | −2.45549E−01 | −2.30113E−01 | −2.30716E−01 |
| A8 = | −1.85615E−02 | 1.28473E−01 | 2.84382E−01 | 2.58060E−01 | 8.69199E−02 |
| A10 = | 1.55808E−02 | −1.44427E−01 | −2.31754E−01 | −1.52593E−01 | −1.27392E−02 |
| A12 = | | | | 4.58557E−02 | −4.98079E−03 |

| | Surface # | | | | |
|---|---|---|---|---|---|
| | 7 | 8 | 9 | 10 | 11 |
| k = | −8.66242E−01 | −3.05074E+00 | −2.92204E+00 | −2.00000E+01 | −7.61011E+00 |
| A4 = | 1.94704E−01 | −1.23602E−01 | −8.94261E−02 | −1.51248E−02 | −4.62221E−02 |
| A6 = | 1.73572E−02 | 2.93392E−02 | 2.78585E−02 | 8.56419E−04 | 5.64118E−03 |
| A8 = | −3.61995E−02 | −6.22203E−03 | −1.10412E−02 | 3.34632E−04 | 6.89247E−04 |
| A10 = | 7.29550E−03 | 3.66878E−04 | 2.14494E−03 | 9.81896E−05 | −1.19280E−04 |
| A12 = | | | −1.97091E−04 | −1.71293E−05 | |

TABLE 9

| | Embodiment 1 | Embodiment 2 | Embodiment 3 | Embodiment 4 |
|---|---|---|---|---|
| f | 6.17 | 6.10 | 3.82 | 3.82 |
| Fno | 2.8 | 2.8 | 2.8 | 2.8 |
| HFOV | 32.9 | 33.0 | 32.6 | 32.7 |
| V1 | 55.9 | 55.9 | 55.9 | 55.9 |
| V4 | 55.9 | 55.9 | 55.9 | 55.9 |
| V1 − V2 | 32.5 | 32.5 | 32.5 | 32.5 |
| V3 − V2 | 32.5 | 32.5 | 32.5 | 32.5 |
| |V4 − V5| | 0.0 | 0.0 | 0.1 | 0.1 |
| (T12/f) * 100 | 3.8 | 3.9 | 5.4 | 6.6 |
| ET4/CT4 | 1.34 | 1.40 | 0.80 | 0.79 |
| f/f1 | 1.35 | 1.40 | 1.34 | 1.24 |
| f/f2 | −0.89 | −0.94 | −0.80 | −0.78 |
| f/f3 | 0.50 | 0.50 | 0.68 | 0.65 |
| f/f4 | 0.50 | 0.50 | 0.07 | 0.05 |
| f/f5 | −1.06 | −1.05 | −0.81 | −0.61 |

TABLE 9-continued

|  | Embodiment 1 | Embodiment 2 | Embodiment 3 | Embodiment 4 |
|---|---|---|---|---|
| R1/R2 | 0.05 | −0.03 | −0.30 | 0.03 |
| R7/R8 | 0.06 | 0.06 | 1.03 | 1.07 |
| R9/R10 | 2.15 | 2.15 | 3.92 | 2.28 |
| TTL/ImgH | 1.83 | 1.84 | 1.91 | 1.93 |

In the present optical lens system for taking image, the lens elements can be made of glass or plastic. If the lens elements are made of glass, there is more freedom in distributing the refractive power of the optical lens system. If the lens elements are made of plastic, the cost will be effectively reduced.

It is to be noted that the tables 1-8 show different data from the different embodiments, however, the data of the different embodiments is obtained from experiments. Therefore, any product of the same structure is deemed to be within the scope of the present invention even if it uses different data. Table 9 lists the relevant data for the various embodiments of the present invention.

While we have shown and described various embodiments in accordance with the present invention, it should be clear to those skilled in the art that further embodiments may be made without departing from the scope of the present invention.

What is claimed is:

1. An optical lens system for taking image comprising, in order from the object side to the image side:
   a first lens element with positive refractive power having a convex object-side surface;
   a second lens element with negative refractive power;
   a third lens element with positive refractive power having a concave object-side surface and a convex image-side surface;
   a fourth lens element with positive refractive power;
   a fifth lens element with refractive power; and
   an aperture stop being located between an object to be photographed and the second lens element; in the optical lens system for taking image, the number of the lens elements with refractive power being limited to five.

2. The optical lens system for taking image as claimed in claim 1, wherein an on-axis distance between the first lens element and the second lens element is T12, a focal length of the optical lens system for taking image is f, and they satisfy the relation:

$0.4 < (T12/f)*100 < 15.$

3. The optical lens system for taking image as claimed in claim 1, wherein an object-side surface of the second lens element is convex.

4. The optical lens system for taking image as claimed in claim 1, wherein the object to be photographed is imaged on an electronic imaging sensor, a total track length of the optical lens system for taking image is TTL, a maximum image height of the optical lens system for taking image is ImgH, and they satisfy the relation:

$TTL/ImgH < 2.05.$

5. The optical lens system for taking image as claimed in claim 1, wherein the fifth lens element has negative refractive power, an Abbe number of the fourth lens element is V4, an Abbe number of the fifth lens element is V5, and they satisfy the relation:

$|V4-V5| < 15.$

6. The optical lens system for taking image as claimed in claim 1, wherein an image-side surface of the fifth lens element is concave.

7. The optical lens system for taking image as claimed in claim 6, wherein an object-side surface of the fifth lens element is convex.

8. The optical lens system for taking image as claimed in claim 7, wherein an image-side surface of the second lens element is concave.

9. The optical lens system for taking image as claimed in claim 8, wherein the fifth lens element is made of plastic material and is formed with inflection points.

10. The optical lens system for taking image as claimed in claim 9, wherein the fourth lens element is made of plastic material and is formed with inflection points.

11. The optical lens system for taking image as claimed in claim 9, wherein an object-side surface of the fourth lens element is convex, and an image-side surface of the fourth lens element is concave.

12. The optical lens system for taking image as claimed in claim 11, wherein an image-side surface of the first lens element is concave.

13. The optical lens system for taking image as claimed in claim 11, wherein the aperture stop is located before the first lens element.

14. The optical lens system for taking image as claimed in claim 13, wherein the fourth lens element is made of plastic material, at least one of the object-side and the image-side surfaces of the fourth lens element is aspheric, an Abbe number of the fourth lens element is V4, it satisfies the relation:

$40 < V4 < 70,$ and the object-side surface and the image-side surface of the fifth lens element are aspheric.

15. The optical lens system for taking image as claimed in claim 14, wherein the second lens element is made of plastic material, at least one of an object-side and the image-side surfaces of the second lens element is aspheric, the third lens element is made of plastic material, and at least one of the object-side and the image-side surfaces of the third lens element is aspheric.

16. The optical lens system for taking image as claimed in claim 15, wherein the first lens element is made of plastic material, at least one of the object-side and an image-side surfaces of the first lens element is aspheric, an Abbe number of the first lens element is V1, an Abbe number of the second lens element is V2, an Abbe number of the third lens element is V3, and they satisfy the relations:

$V1-V2 > 15;$ $V3-V2 > 15.$

17. The optical lens system for taking image as claimed in claim 13, wherein a focal length of the optical lens system for taking image is f, a focal length of the first lens element is f1, a focal length of the fourth lens element is f4, and they satisfy the relations:

$1.1 < f/f1 < 2.0;$ $0 < f/f4 < 0.8.$

18. The optical lens system for taking image as claimed in claim 17, wherein the focal length of the optical lens system for taking image is f, a focal length of the second lens element is f2, and they satisfy the relation:

$-2.5 < f/f2 < -0.7.$

19. The optical lens system for taking image as claimed in claim 18, wherein the focal length of the optical lens system for taking image is f, a focal length of the fifth lens element is f5, and they satisfy the relation:

$-2.0 < f/f5 < -0.75$.

20. The optical lens system for taking image as claimed in claim 19, wherein the focal length of the optical lens system for taking image is f, the focal length of the fourth lens element is f4, and they satisfy the relation:

$0.0 < f/f4 < 0.3$.

21. The optical lens system for taking image as claimed in claim 17, wherein the focal length of the optical lens system for taking image is f, the focal length of the first lens element is f1, a focal length of the third lens element is f3, the focal length of the fourth lens element is f4, and they satisfy the relations:

$1.1 < f/f1 < 1.4$;

$0.6 < f/f3 < 0.8$;

$0.03 < f/f4 < 0.2$.

22. The optical lens system for taking image as claimed in claim 13, wherein a radius of curvature of the object-side surface of the first lens element is R1, a radius of curvature of an image-side surface of the first lens element is R2, and they satisfy the relation:

$R1/R2 > -0.22$.

23. The optical lens system for taking image as claimed in claim 22, wherein a radius of curvature of the object-side surface of the fourth lens element is R7, a radius of curvature of the image-side surface of the fourth lens element is R8, and they satisfy the relation:

$0 < R7/R8 < 1.6$.

24. The optical lens system for taking image as claimed in claim 23, wherein the radius of curvature of the object-side surface of the first lens element is R1, the radius of curvature of an image-side surface of the first lens element is R2, and they satisfy the relation:

$-0.2 < R1/R2 < 0.3$.

25. The optical lens system for taking image as claimed in claim 24, wherein a radius of curvature of the object-side surface of the fifth lens element is R9, a radius of curvature of the image-side surface of the fifth lens element is R10, and they satisfy the relation:

$2.0 < R9/R10 < 4.0$.

26. The optical lens system for taking image as claimed in claim 13, wherein an Abbe number of the first lens element is V1, and it satisfies the relations:

$50 < V1 < 58$.

27. The optical lens system for taking image as claimed in claim 13, wherein an edge thickness of the fourth lens element is ET4, a center thickness of the fourth lens element is CT4, and they satisfy the relation:

$0.6 < ET4/CT4 < 1.0$.

* * * * *